(12) United States Patent
Goldsmith (10) Patent No.: US 7,340,179 B2
(45) Date of Patent: Mar. 4, 2008

(54) SUPPORT OF DUAL INFRARED REMOTE SIGNALING PROTOCOLS

(75) Inventor: Michael A. Goldsmith, Lake Oswego, OR (US)

(73) Assignee: Intel Corporation, Santa Clara, CA (US)

( * ) Notice: Subject to any disclaimer, the term of this patent is extended or adjusted under 35 U.S.C. 154(b) by 688 days.

(21) Appl. No.: 10/334,501

(22) Filed: Dec. 31, 2002

(65) Prior Publication Data

US 2004/0153699 A1 Aug. 5, 2004

(51) Int. Cl.
*H04B 10/00* (2006.01)

(52) U.S. Cl. .......................... 398/118; 398/25; 398/124

(58) Field of Classification Search ............ 398/25–29, 398/147–149, 158, 192–194, 118, 124, 127, 398/128

See application file for complete search history.

(56) References Cited

U.S. PATENT DOCUMENTS

| | | | | |
|---|---|---|---|---|
| 5,850,189 A | * | 12/1998 | Sakanaka et al. | 340/825.72 |
| 6,944,402 B1 | * | 9/2005 | Baker et al. | 398/128 |
| 2005/0021870 A1 | * | 1/2005 | Carnahan et al. | 709/249 |

* cited by examiner

*Primary Examiner*—Dzung Tran
(74) *Attorney, Agent, or Firm*—Molly A. McCall (57) ABSTRACT

A system and method for supporting two infrared signaling protocols in a single computing device is provided. The computing system operates in a default mode unless a priority signaling request is generated by an application program. Priority signaling requests are given processing priority, and default mode transmission packets may be dropped during priority mode processing. Handling of dropped default mode packets is relinquished to an upper protocol layer of a network stack, which recovers and sends the dropped transmissions to the infrared device when the computing device returns to the default mode.

24 Claims, 7 Drawing Sheets

SUPPORT OF DUAL INFRARED REMOTE SIGNALING PROTOCOLS

BACKGROUND

1. Technical Field

The present invention relates generally to information processing systems and, more specifically, to transmission of infrared remote control signals.

2. Background Art

Computing devices often provide a means for communicating with other such devices via infrared signaling. Often, the Infrared Data Association's (IrDA) protocol for transmitting and receiving data via infrared signals is utilized in such devices. Increasingly, computing devices such as notebook computers, personal digital assistants (PDA's), printers, etc., come equipped with built-in IrDA infrared ports. Accordingly, such computing devices may send data to one another without requiring a cable connection, as long as there is no interference with the infrared signal transmission.

Similarly, many consumer electronics, such as television sets, stereo equipment, camcorders, videocassette recorders and players, etc., are capable of operating via infra-red remote control. However, such devices typically do not utilize the IrDA protocol for transmitting and receiving infrared signals; indeed many consumer devices, such as television sets, only receive infrared signals and do not transmit them. Consumer electronics typically operate using one of a set of manufacturer-specific protocols known collectively as consumer infrared ("CIR" or "ConsumerIR").

It would be beneficial to support both the IrDA and CIR infrared signaling protocols from a single computing device, such as a notebook computer, to allow the consumer to use both IrDA infrared signaling (for instance, to communicate with another device such as a PDA) and CIR signaling (for instance, to control consumer electronics). However, the infrared signals generated according to the IrDA and CIR protocols are not compatible with each other. Generally, each type of signal will cause interference with the other, and both transmissions will fail if the two signals are transmitted so that they interfere with each other. Embodiments of the method and apparatus disclosed herein address these and other concerns related to support of dual infrared signaling protocols in a single computing device.

BRIEF DESCRIPTION OF THE DRAWINGS

The present invention may be understood with reference to the following drawings in which like elements are indicated by like numbers. These drawings are not intended to be limiting but are instead provided to illustrate selected embodiments of a method and apparatus for supporting dual infrared signaling technologies.

DETAILED DISCUSSION

Figure 1:
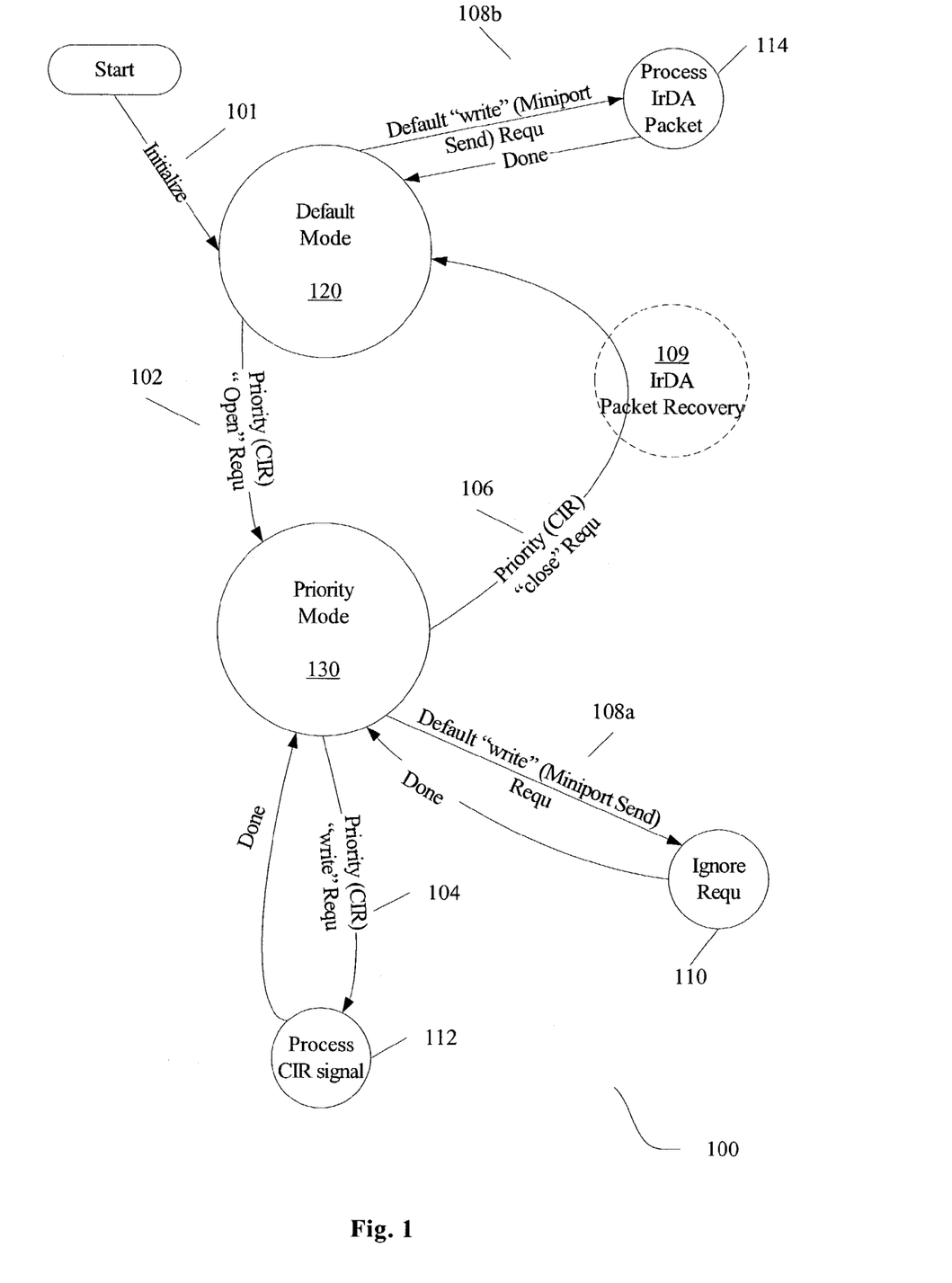
FIG. 1 is a state diagram illustrating at least one embodiment of a method of supporting dual infrared signaling modes.

FIG. 1 is a state diagram illustrating a method of supporting, within a single computing device, two types of infrared signaling protocols. As used herein, a computing device is intended to encompass a notebook, laptop, or personal computer having a processor, but may also include any other device capable of emitting an infrared signal including, without limitation, cellular telephones, personal digital assistants and other hand-held devices, engineering workstations, set-top boxes and the like. A generic representation of a computing device 310 is provided in FIG. 3 and is referenced repeatedly herein in connection with the other figures.

For at least one embodiment, the two protocols supported by the method 100 are the IrDA protocol and the set of consumer electronics protocols referred to collectively as CIR. These two protocols are generally recognized to be incompatible with each other, and the method 100 therefore ensures that the two signaling protocols are not used at the same time. Generally, FIG. 1 illustrates a method 100 that allows infrared (IR) communications according to a default IR signaling protocol to proceed normally unless an application wishes to transmit according to a second IR signaling protocol. The second IR signaling protocol is given priority over the default protocol.

FIG. 1 illustrates that a method 100 of supporting dual infrared signaling protocols includes selecting one of the two protocols as the default mode and placing 101 the computing device 310 into the selected mode. As used herein, when the computing device 310 is configured to carry out IrDA infrared communications, it is said to be in the IrDA mode. Similarly, when the computing device 310 is configured to carry out CIR infrared communications, it is said to be in the CIR mode.

The CIR protocol is typically used for intermittent operations, such as changing the channel on a television set or stereo. Due to this intermittent nature, the other infrared signaling mode is selected as the default mode. The infrared signaling mode selected as the default mode for the embodiments discussed herein is the IrDA mode. The IrDA mode is thus referred to herein as the "default mode" 120. The other mode, which is the CIR mode for the embodiments discussed here, is referred to herein as the "priority mode" 130.

For at least one embodiment, the computing device 310 is placed into the desired signaling mode, either upon initialization 101 or mode transition 102, 106, by modifying a hardware indicator, such as a register, to place the computing system's 310 hardware in the appropriate infrared signaling mode. In addition, a software indicator, such as a flag, is also modified to indicate the desired infrared signaling mode. In this manner, the computing device 310 is configured to carry out the selected infrared signaling protocol.

FIG. 1 illustrates that the method 100 provides for state transitions responsive to certain requests. The requests are generated, for at least one embodiment, when an application program 275 running at the application layer 270 (FIG. 2, discussed below) desires to send an infrared communication to the IR device 304 (FIG. 3). Any type of known request, for either signaling protocol, may be handled by the method 100. For purposes of example, illustrative requests are set forth in FIG. 1, but one skilled in the art will recognize that request types may vary by protocol, and all such request types are encompassed by the appended claims. For example, the method 100 includes a method 108 for handling a default mode "write" request, a method 102 for handling a priority mode "open" request, a method 104 for handling a priority mode "write" request, and a method 106 for handling a priority mode "close" request.

The method 100 handles requests such that requests for the priority mode 130 receive processing preference over requests for the default mode 120. As a result of the prioritized processing of the method 100, it may be that requested IrDA transmissions and incoming receptions are dropped while the computing device is in the priority mode 130. Accordingly, at block 109 the method 100 provides for error recovery such that dropped packets from the default mode will be handled appropriately.

For at least one embodiment, known error recovery functionality 109 associated with blocked IrDA transmissions is performed during transition 106 from priority mode 130 to default mode 120 in order to recover and transmit dropped packets. In an alternative embodiment, error recovery 109 is performed after the computing system 310 returns to the default infrared signaling mode 120. Accordingly, the optional placement of block 109 processing is indicated with broken lines in FIG. 1.

Figure 2:
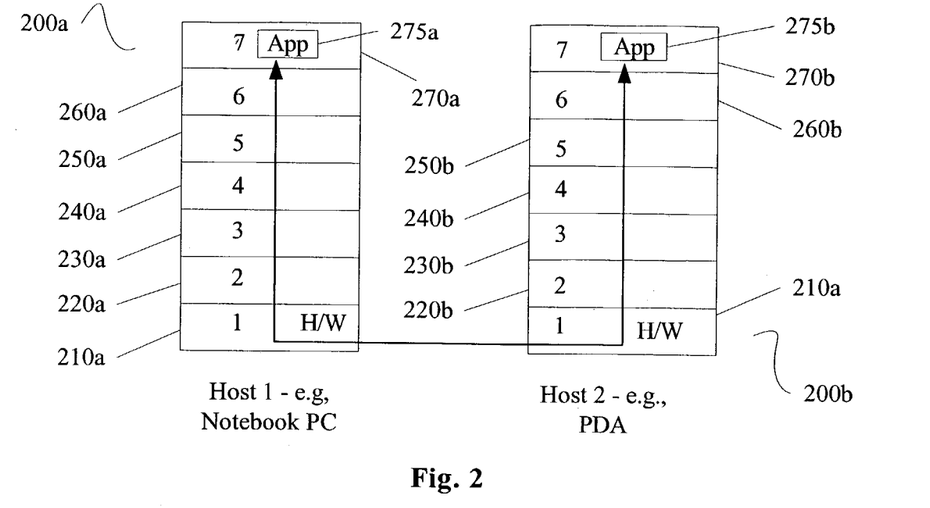
FIG. 2 is a functional block diagram illustrating communication between typical seven-layer networking frameworks using the ISO (International Standards Org) OSI (Open Systems Interconnect) model.
Figure 3:
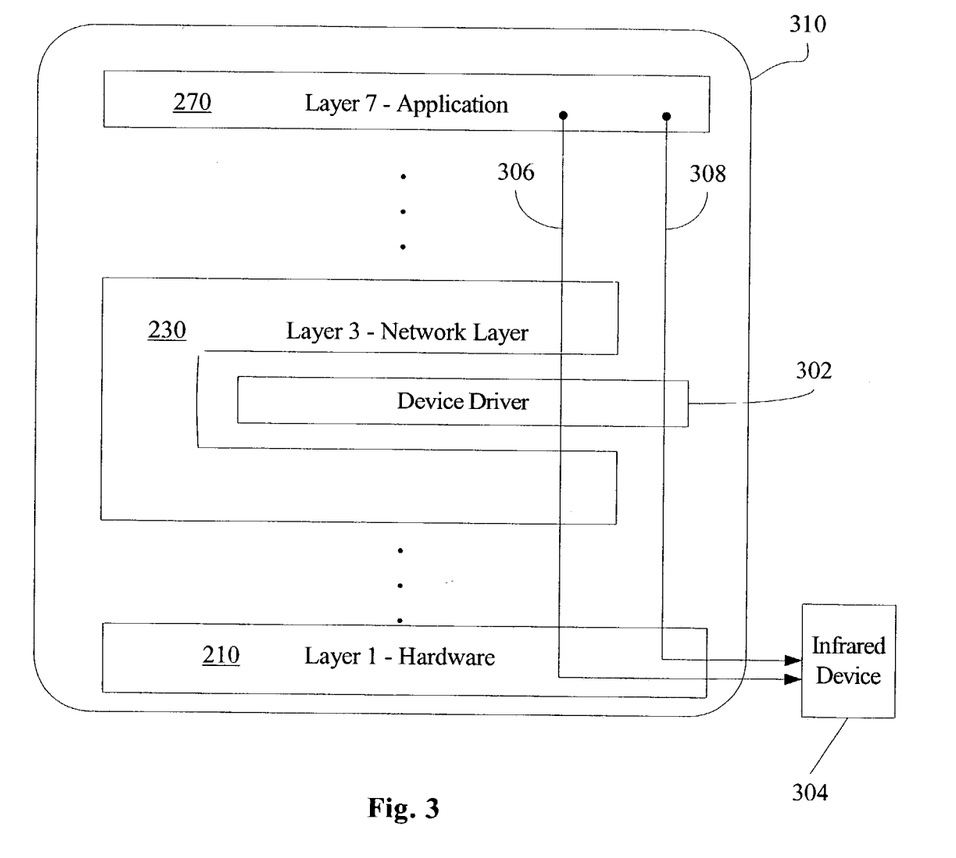
FIG. 3 is a functional block diagram illustrating a driver that plugs into the network layer of a networking framework.

Reference to FIGS. 2 and 3, in addition to FIG. 1, illustrate that the method 100 illustrated in FIG. 1 may be performed by a software program. For at least one embodiment, the software program that performs all aspects of the method except packet recovery 109 is a device driver 302 that acts as a translator between an application program 275 and a device 304 that may receive infrared signals.

FIGS. 2 and 3 illustrate that at least one embodiment of device driver 302 is designed as a driver that conforms to the Miniport driver model of the Network Driver Interface Specification (NDIS) developed by Microsoft Corporation and others. A device driver 302 for such embodiment is designed to interface with the Windows™ family of operating systems. One skilled in the art will recognize that device driver 302 need not necessarily conform to NDIS, nor be limited to interfacing with any particular operating system. Any type of device driver mechanism capable of supporting dual infrared signaling protocols as described herein is intended by the use of the terms "driver" and "device driver."

FIG. 2 illustrates a seven-layer networking framework 200 that is often used to discuss implementation of communications protocols. The illustrated framework 200 corresponds to the Open Systems Interconnection (OSI) standard, a standardized architecture for designing networks. According to the OSI standard, control is passed from one layer to the next, starting at the application layer 270a of a first host, such as a PC or laptop computer running a web browser. For at least one embodiment, the computing system 310 illustrated in FIG. 3 may act as such a host. Control proceeds to the bottom layer 210a, over a primary channel 306 (FIG. 3) to the next host, such as a PDA, and back up the hierarchy 200b to the application layer 270b on the second host. The OSI network framework 200 is used herein for reference only. One skilled in the art will recognize that, rather than being a universal communications standard, OSI is used as the reference model for network protocol implementations. Most of the functionality of the OSI model exists in other communications systems, although the functionality of two or more OSI layers may be incorporated into one layer of other protocols. For example, NDIS specifies a program interface, usually called a protocol stack, that generally corresponds to layer 3 (Network Addressing Layer) 230 and layer 4 (Transport layer) 240 of the OSI framework 200. Generally, as used herein, the term "protocol layer" is intended to refer to the layers of a networking framework defined by any protocol, including the OSI framework, the NDIS protocol, or any other layered networking protocol. The terms "networking framework," and "network stack," as well as reference numeral 200, are used interchangeably hereinafter to refer to any implementation of a network protocol according to the OSI framework, the NDIS protocol, or any other layered networking protocol.

The Windows™ family of operating systems also specifies a program interface for a miniport device driver, which interacts with a network interface card (NIC) or other adapter hardware. The driver 302 is designed, for at least one embodiment, as a miniport device driver that provides an interface to an IrDA device. However, the driver 302 is also designed, as is explained in further detail below, to support communications with a CIR device, though CIR is not a networking protocol. FIG. 3 illustrates that at least one embodiment of the driver 302 is designed to plug into the network stack 200 as an NDIS miniport driver that also provides a direct, non-network path for controlling CIR.

In the IrDA mode, the physical layer 210 causes an infrared light to be emitted according to the IrDA protocol in order to communicate with the infrared device 304. In the CIR mode, the physical layer causes an infrared light to be emitted according to the appropriate CIR protocol. One skilled in the art will understand that emission of the infrared signal does not guarantee that the signal will be received by the infrared device 304. That is, the infrared signal could get blocked due to interference. For example, it is quite possible to accidentally interrupt the infrared signaling by placing an object between the emitting device and the infrared device 304. In this sense, the infrared communication between the hardware layer 210 and the infrared device 304 is inherently unreliable—it can quite possibly get disrupted.

The transport layer 240 of the network stack 200 is responsible for detecting such interrupted transmissions and re-transmitting lost packets when needed. Restated, the transport layer 240 is responsible for ensuring reliable communications in the presence of what may be inherently unreliable lower layers of the networking framework 200. For simplicity, the following references to the transport layer 240 and other layers of the OSI framework 200 are intended to encompass similar functionality in protocols other than the OSI model, with the understanding that such functionality may be called by other names, or may be combined with the functionality of other OSI layers, in a given protocol.

FIGS. 1 and 2 are referenced for further discussion of the error recovery mechanism utilized for recovery 109 of default protocol packets. As stated above, the error recovery method 109 utilizes a known error recovery mechanism associated with blocked network communications. That is, the method 100 simply relies on an existing error recovery mechanism that is already in place to handle blocked IrDA transmission that might occur, for example, if a person or object is placed between two computing devices during attempted IrDA transmission between the two devices.

Typically, while the method 100 is performed at a certain layer, such as the network layer 230 of a network stack 200, the existing recovery mechanism utilized to perform error recovery 109 is associated with a higher protocol layer. For instance, the IrDA recovery mechanism is typically associated with layer 4, the transport layer 240, of the network stack 200. Alternatively, in some instances the error recovery mechanism utilized to perform error recovery 109 may be associated with the requesting application 275 at the application layer 270 of the network stack 200. Other embodiments may associate the error recovery mechanism utilized to perform error recovery at yet other layers of the network stack 200.

Regardless of which layer of the network stack 200 is associated with the error recovery mechanism utilized to perform error recovery 109, the error recovery mechanism is associated, for the embodiments discussed herein, with a higher level of the network stack 200 than the device driver 302 (FIG. 3). The term "upper protocol layer" is thus intended to denote any layer of a network stack 200 that is higher than the layer of the network stack 200 wherein the functionality associated with the method of FIG. 1 (except error recovery 109) occurs, the upper protocol layer being associated with the existing recovery mechanism utilized for error recovery 109.

The method 100 capitalizes on the fact that the transport layer 240 expects lower layers of the stack, including the network layer 230 and the associated device driver 302, to be unreliable. As the following discussion indicates, packets relating to IrDA communications may be dropped when the computing device is in the priority infrared signaling mode 130. In such case, the driver 302 (FIG. 3), by dropping packets, emulates the blocking of IrDA transmissions due to interference. Because the transport layer 240 or other upper layers are designed to detect and recover from such dropped transmissions, the dropping of default mode packets while in the priority mode 130 is a situation that the existing error recovery mechanism of the transport layer 240 or other upper layers are well equipped to handle. The device driver 302 (FIG. 3) accordingly takes appropriate action to mimic a blocked transmission and then relinquishes handling of the ostensibly blocked transmission to the error recovery mechanism of an upper protocol layer.

One skilled in the art will recognize that, in certain instances, the desired error recovery approach is to allow dropped packets to go unrecovered. It is desirable in some situations, such as when streaming live audio over a network, simply to allow dropped packets to be skipped. The reason for this is that taking the time to recover would compromise the delivery of subsequent packets in the stream, disrupting the desired real-time nature of the transmission.

FIGS. 1 and 3 illustrate that the method 106 ensures that the two signaling modes, the default mode 120 (such as IrDA) and the priority mode 130 (such as CIR) are not used at the same time, thus avoiding potentially disruptive interference with each other. For at least one embodiment, the method 100 is performed by device driver 302.

Priority mode signaling requests, such as "open", "close" and "write" requests, are given priority over default mode signaling requests. For background reference, it should be mentioned that, for at least one embodiment, it is anticipated that the default mode requests are initiated by an application 275 at the application layer 270 of the network stack, and are provided by the operating system to the driver 302 over a primary channel 306 via the layers of the network stack 200. If, however, an application 275 desires to send a priority mode communication, such as CIR "open", "write" or "close", this intent is signaled to the driver 302 via a secondary device driver channel 308, bypassing the network stack 200. In this manner, priority requests are received by the device driver 302 outside the layers of the network stack 200.

Figure 5:
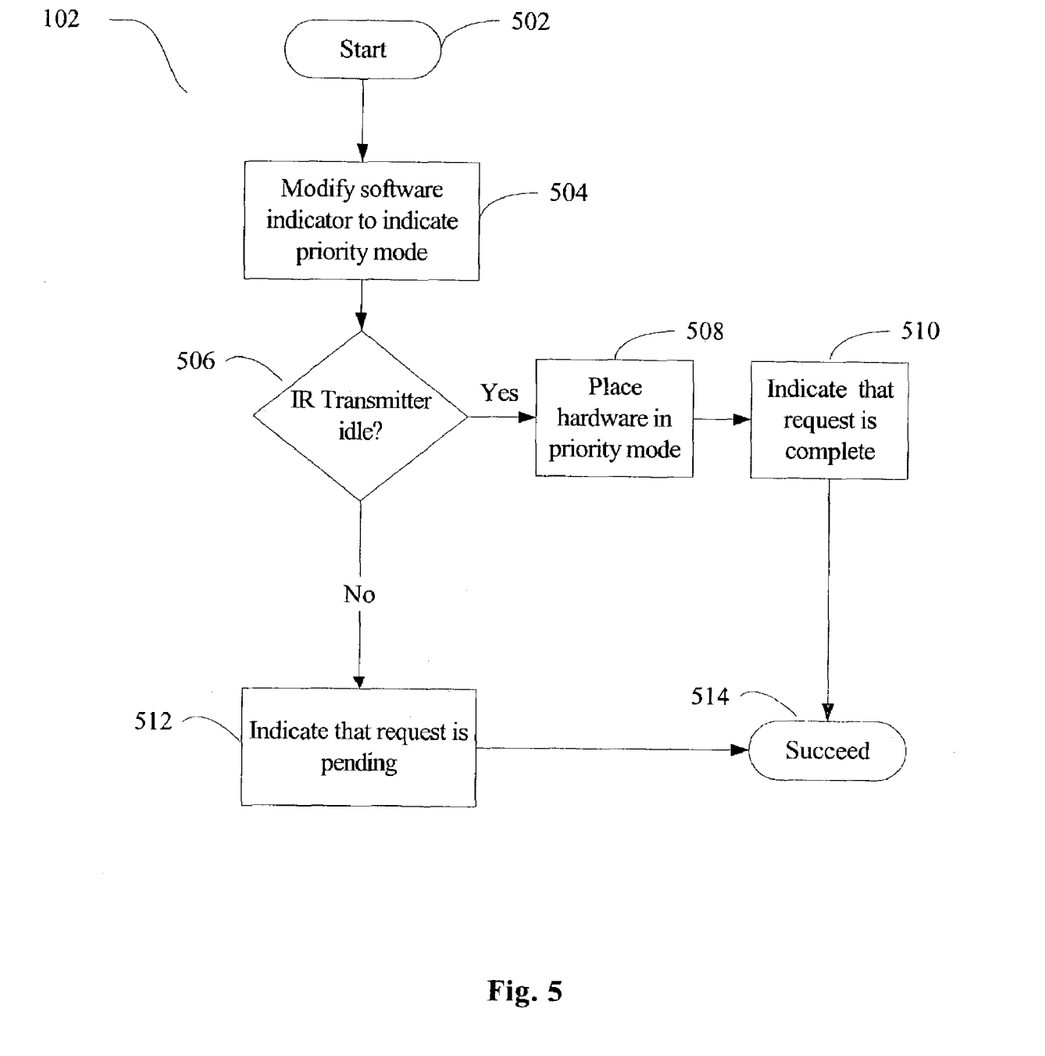
FIG. 5 is a flowchart illustrating at least one embodiment of handling for a priority mode "open" request.

FIGS. 1 and 5 illustrate a method 102 for handling for a priority mode "open" request received while in the default mode 120. The method 102 causes a transition from the default mode 120 to the priority mode 130. The "open" request is initiated by an application 275 (FIG. 2) to indicate the desire to perform one or more CIR "write" transmission to the infrared device 304 (FIG. 3). Each "write" transmission may be viewed as the equivalent of pushing a button on a remote control device.

Processing to transition from the default mode 120 to the priority mode 130 in response to a priority mode "open" request begins at block 502. When a priority mode "open" request has been received, the priority mode 130 is initiated 504 without regard for the current mode. In this manner, the priority mode 130 is given processing priority. (In contrast, the discussion, below, of FIG. 8 indicates that default mode "write" requests are not fully processed if the computing device 310 (FIG. 3) is currently in the priority mode 130.) FIG. 5 illustrates that the priority mode 130 is initiated by setting 504 a software indicator, such as a flag, to indicate that the computing device 310 (FIG. 3) is now in the priority mode. In addition, a check 506 is performed to determine whether hardware (such as a register) may be modified in order to complete configuration for the priority mode. At block 506, it is determined whether the infrared transmitter on the computing device 310 (FIG. 3) is idle. If so, the hardware is modified to place 508 the hardware in CIR mode. The driver 302 (FIG. 3) then indicates 510 that the "open request" has been serviced. For one embodiment, the indication so generated 510 indicates to the operating system that the system call is complete and the operating system is free to indicate to the requesting application 275 that servicing of the "open" request has been completed and that the computing device 310 (FIG. 3) has now been configured for the priority mode.

If it is determined 506 that the IR transmitter is not idle, then the current "open" request is not immediately processed. The driver indicates 512 that the "open" request has not yet been serviced, but is pending. For at least one embodiment, the pending request will be serviced upon receipt of an interrupt (not shown) indicating that previously-requested packets have been transmitted and the transmitter is now idle.

Regardless of whether the open request is completed 508, 510 or pended 512, the "open request" is considered, for purposes of the network stack 200, to have been successfully completed if either approach is taken. Accordingly, the driver 302 (FIG. 3) indicates 514 that the request has been successfully processed by the network layer 230 (FIG. 3). Based on this indication, the transport layer 240 (FIG. 2) is notified to perform error checking on this transmission to ensure that the IR device 304 received the transmission and, if necessary, to re-send the transmission.

Figure 6:
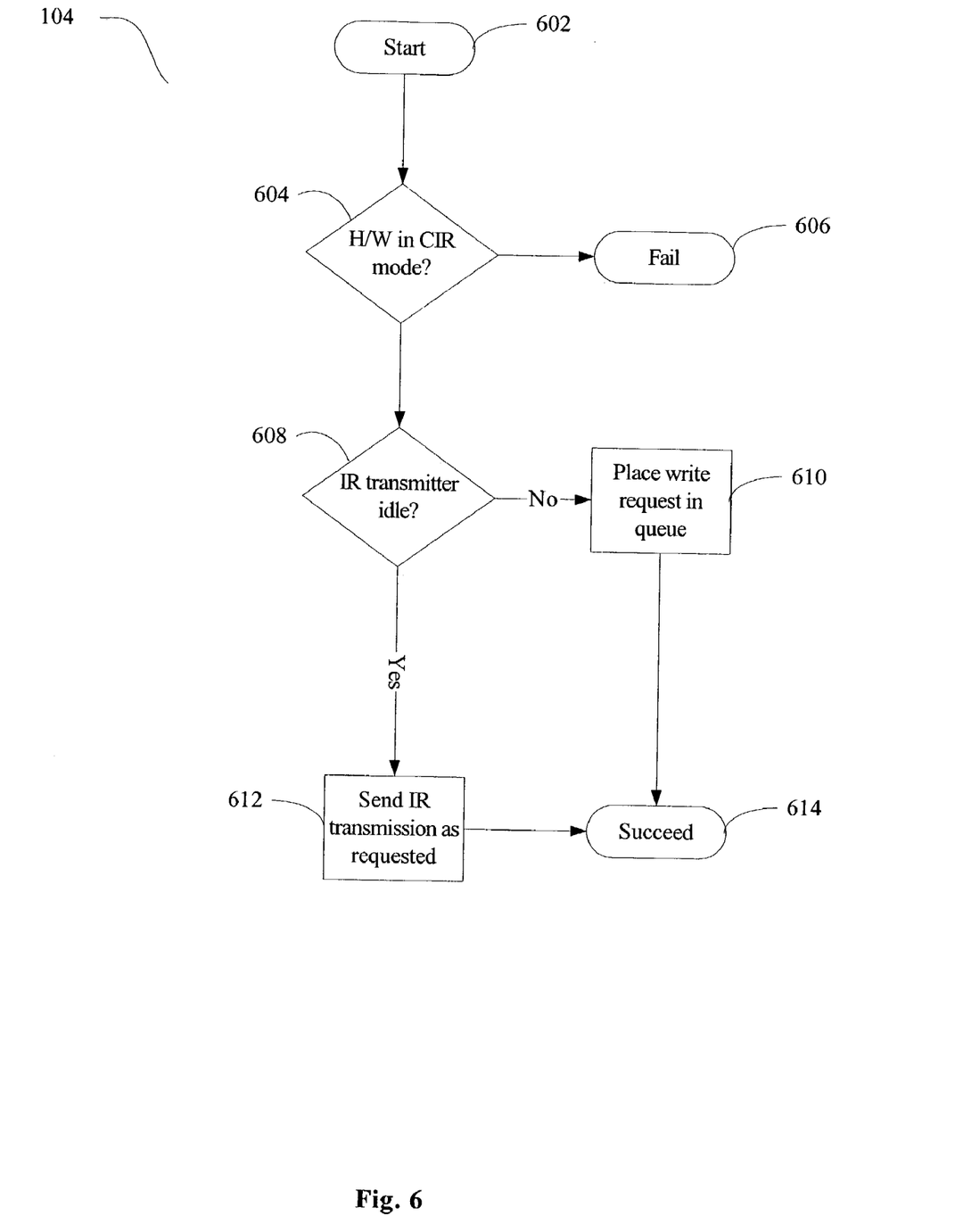
FIG. 6 is a flowchart illustrating at least one embodiment of handling for a priority mode "write" request.

FIGS. 1 and 6 illustrate a method 104 of processing a priority mode infrared "write" request. For at least one embodiment, the "write" request is generated by an application to transmit infrared signals, according to the priority protocol, to the IR device 304 (FIG. 3). At block 604, an error-checking inquiry is performed. It is determined 604 whether the computer device's IR hardware is configured for the CIR mode. If not, an error has occurred. During normal operation, the application would initiate a priority mode IR communication by sending an "open" request to be processed as discussed above in connection with FIG. 5. If, however, the hardware has not been initialized for the priority mode, then a failure indication is generated 606.

If it is determined 604 that the computer device's IR hardware is configured for the CIR mode, then processing continues at block 608. At block 608 it is determined whether the IR transmitter for the computing device is idle. If so, the IR signal as requested by the application in the "write" request is emitted 612 in order to communicate with the IR device 304, and a success indication is generated 614 in order to indicate to the transport layer 240 that the transmission was attempted.

If it is determined 608 that the IR transmitter is not idle, it is assumed that the IR transmitter is already processing a prior write request. In such case, the current write request is placed 610 into a pending write request queue that is maintained by the driver 302. It is assumed that such queued transmission will eventually be sent in response to an indicator from an interrupt service routine (not shown). Accordingly, a success indication is generated 614 in order to notify the transport layer 240 that the transmission has been attempted.

FIG. 1 illustrates that the determination 604 that the hardware is in CIR mode causes the computing system 310 (FIG. 3) to transition into a sub-state 112 of the priority mode 130. In subs-state 112, the IR transmission is sent 612 or pended 610. When the success indication is generated 614, the sub-state 112 is exited.

Figure 7:
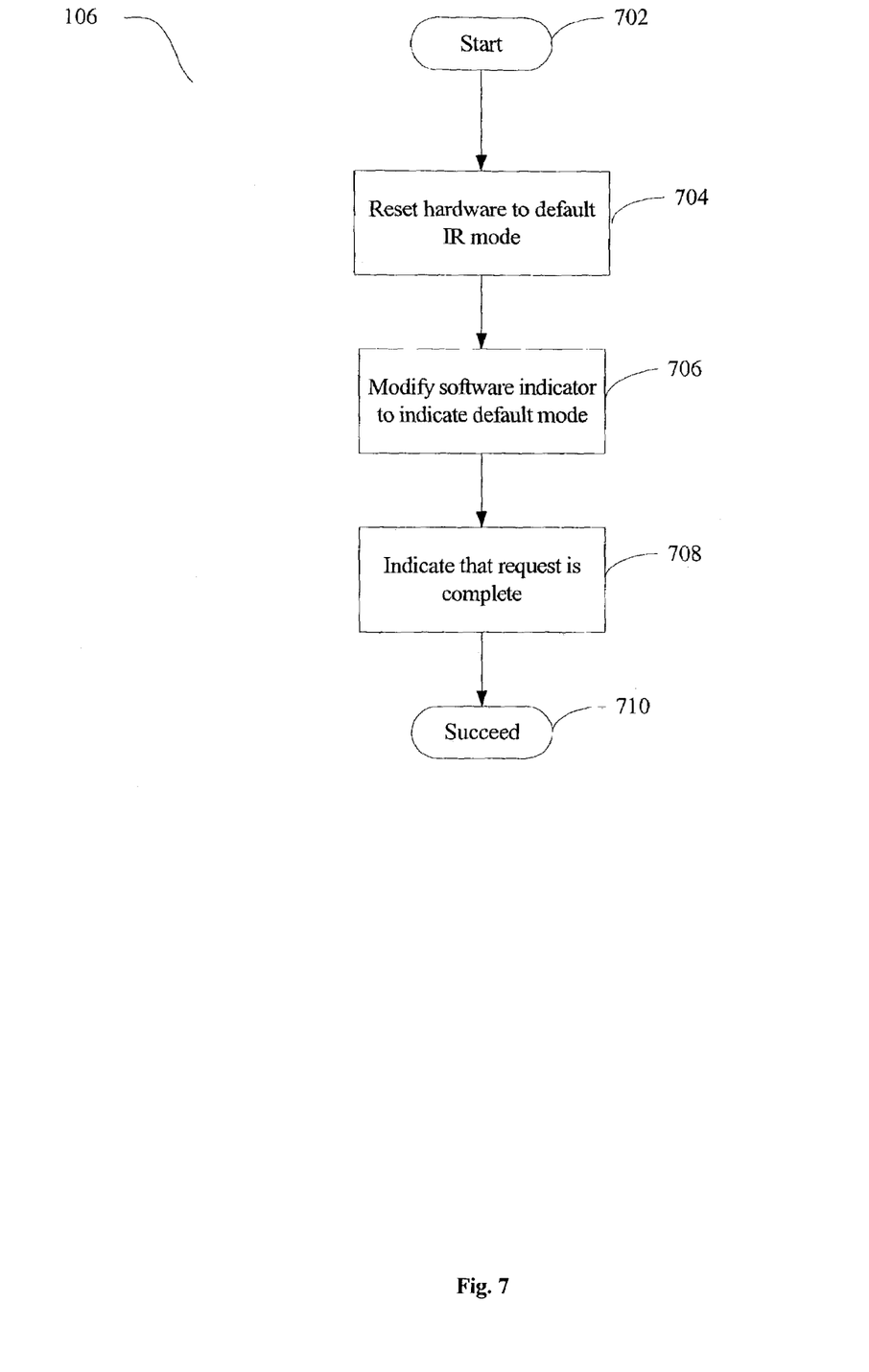
FIG. 7 is a flowchart illustrating at least one embodiment of handling for a priority mode "close" request.

FIGS. 1 and 7 illustrate a method 406 for processing a priority mode "close" request to transition from the priority mode 130 to the default mode 120. For at least one embodiment, it is anticipated that a "close" request is generated by the application 275 after it has 1) indicated its intention to transmit CIR signals by issuing a priority "open" request and 2) requested transmission of one or more IR signals via "write" request(s). After all such write requests have been generated for the current task, the application generates a priority "close" request to indicate that the priority IR transaction has been completed and it is now permissible to resume the default IR mode.

Figure 4:
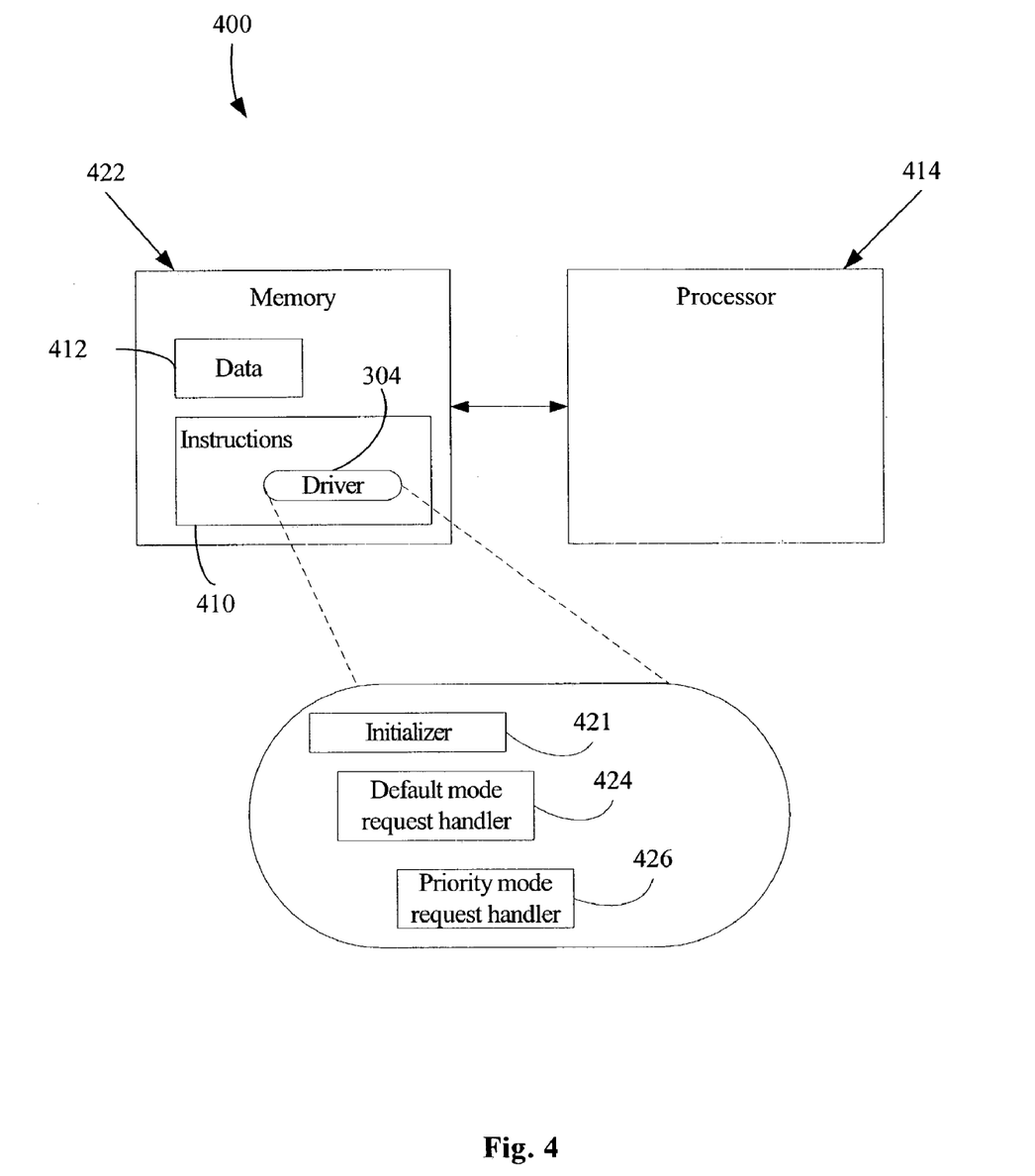
FIG. 4 is a block diagram illustrating a processing system capable of supporting dual infrared remote signaling protocols.

Because it is a request pertaining to the priority mode, the priority "close" request is received over a secondary device driver channel 308 (FIG. 4) outside of the network stack 200 (FIG. 2), as are the other priority mode signaling requests ("open" and "write") discussed above. FIG. 7 illustrates that the hardware, such as a register, that was modified at block 508 (FIG. 5) to configure the computing device for the priority mode 130 is now modified 704 to configure the computing device back to the default IR signaling mode 120. Similarly, the software indicator that was modified at block 504 to indicate the priority mode is now modified 706 to indicate that the computing device 310 is back in the default IR signaling mode 120. At block 708, the driver 302 indicates that processing of the priority "close" request has been completed. Based on this indication, the system call is considered complete and the operating system is free to indicate to the requesting application 275 that processing of the priority "close" request has been completed. FIG. 4 indicates that, in addition to the method 406 illustrated in FIG. 7, the processing of a priority close request may also include IrDA packet recovery 109 discussed above. The optional placement of the recovery processing 109, which may be incorporated into the method 406 of transitioning from priority to default signaling modes, rather than being performed after the system has returned to the default mode 120, is indicated by broken lines in FIG. 4.

The preceding discussion of FIGS. 1, 5, 6 and 7 has demonstrated that the priority "open", "write", and "close" requests are processed such that they are given priority over the default "write" requests. That is, the computer device 310 (FIG. 3) is put into the priority mode 130 when a priority "open" request is received and the computing device 310 (FIG. 3) remains in the priority mode 130 until a "close" request is received and processed.

Figure 8:
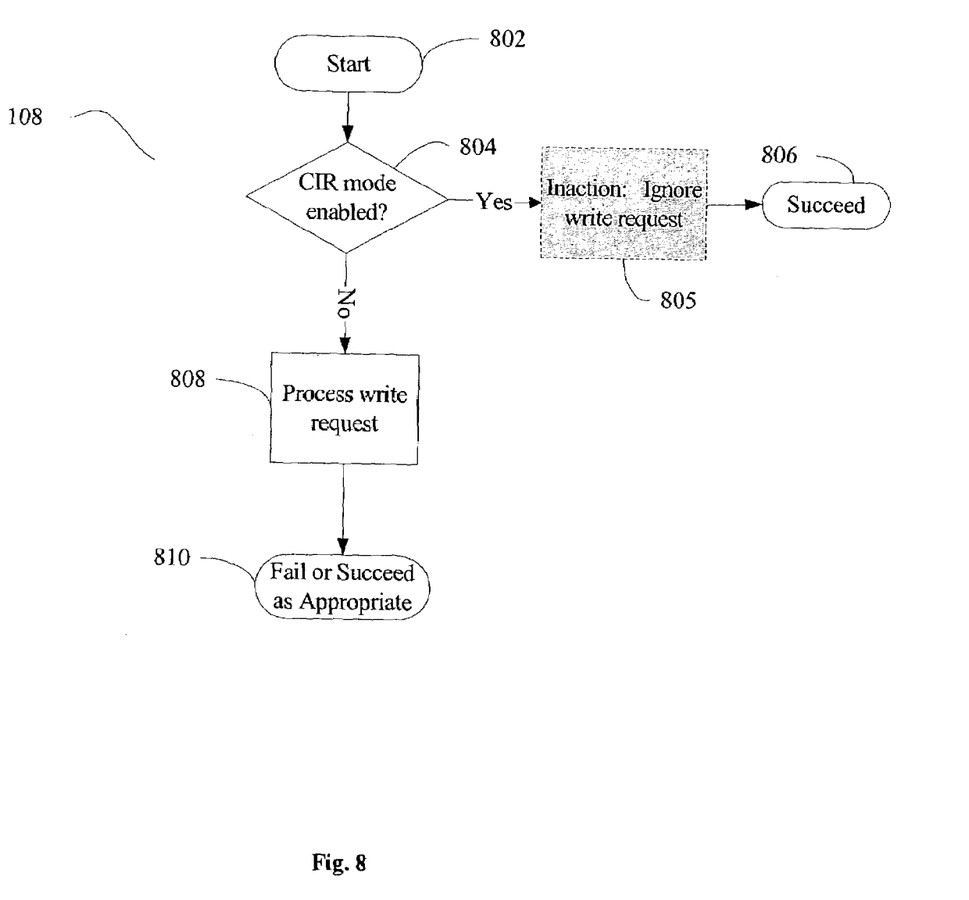
FIG. 8 is a flowchart illustrating at least one embodiment of handling for a default mode "write" request.

FIGS. 1 and 8 further illustrate this priority scheme, in that packets associated with default "write" requests may be dropped if the computing device is configured for the priority IR signaling mode 130. FIG. 8 illustrates that a method 108 for processing a default "write" request checks 804 to determine whether the computing system is currently configured for the priority mode 130. If so, a sub-state 110 of the priority mode 130 is entered. In the sub-state 110, the packets associated with the desired default write operation are ignored 805, but the driver 302 (FIG. 3) nonetheless generates 806 a success indicator and the sub-state 110 is exited. The dropping of packets occurs as a result of ignoring 805 the default mode write request but nonetheless generating 806 a success indicator. These two blocks 805, 806 together comprise a method 108*a* of processing a default "write" request (such as a Miniport send request) to mimic a blocked transmission when the request is received while in the priority mode 130. The success indicator generated at block 806 is interpreted by the transport layer 240 or other upper protocol layer as an indication that the transmission was attempted. Because the IR device 304 will not receive the transmission (because, in reality, the transmission was not attempted), it is anticipated that the transport layer 240, or other upper protocol layer, will recover and transmit the dropped packets according to an existing error recovery mechanism. In this manner, an attempted default-mode write that is dropped during priority mode 130 will have the same effect as if the default mode write transmission were attempted, but was physically blocked so that it could not be received by the IR device 304. The existing error mechanism that is relied upon to perform error recovery 109 (FIG. 1) is not part of the device driver 302; the device driver 302 does not actively invoke the error recovery mechanism. By ignoring default mode write request packets 805 and generating 806 the success indicator, the method 100 mimics an error condition (blocked IrDA transmission). The device driver 302, or any other mechanism that performs the method 100, thus relinquishes handling of an ignored default mode write request packets to an existing mechanism to perform error recovery 109.

If, on the other hand, it is determined at block 804 that the computing device is currently configured for the default IR signaling mode 120, then a sub-state 114 of the default mode 120 is entered to process the write request. The write request is processed 808, 810 in a known manner in order to perform a method 108*b* of processing a default "write request" (such as a Miniport send request) when in the default mode 120. For at least one embodiment, blocks 808 and 810 of the method 108*b* of processing the default write request proceed in accordance with the NDIS specification for a miniport driver that supports an IrDA device.

In the preceding description, various aspects of a method for supporting dual infrared signaling protocols have been described. For purposes of explanation, specific numbers, examples, systems and configurations were set forth in order to provide a more thorough understanding. However, it is apparent to one skilled in the art that the described methods may be practiced without the specific details. In other instances, well-known features were omitted or simplified in order not to obscure the method.

Embodiments of the method 100 may be implemented in hardware, software, firmware, or a combination of such implementation approaches. Software embodiments of the method 100 may be implemented as computer programs executing on programmable systems comprising at least one processor, a data storage system (including volatile and non-volatile memory and/or storage elements), at least one input device, and at least one output device. Program code may be applied to input data to perform the functions described herein and generate output information. The output information may be applied to one or more output devices, in known fashion. For purposes of this application, a processing system includes any system that has a processor, such as, for example, a digital signal processor (DSP), a microcontroller, an application specific integrated circuit (ASIC), or a microprocessor.

The programs may be implemented in a high level procedural or object oriented programming language to communicate with a processing system. The programs may also be implemented in assembly or machine language, if desired. In fact, the dynamic method described herein is not limited in scope to any particular programming language. In any case, the language may be a compiled or interpreted language The programs may be stored on a storage media or device (e.g., hard disk drive, floppy disk drive, read only memory (ROM), CD-ROM device, flash memory device, digital versatile disk (DVD), or other storage device) readable by a general or special purpose programmable processing system. The instructions, accessible to a processor in a processing system, provide for configuring and operating the processing system when the storage media or device is read by the processing system to perform the procedures described herein. Embodiments of the invention may also be considered to be implemented as a machine-readable storage medium, configured for use with a processing system, where the storage medium so configured causes the processing system to operate in a specific and predefined manner to perform the functions described herein.

An example of one such type of processing system is shown in FIG. 4. Sample system 400 may be used, for example, to execute the processing for a method of supporting dual infrared signaling protocols, such as the embodiments described herein. Sample system 400 is representative of processing systems based on the Pentium®, Pentium® Pro, Pentium® II, Pentium® III, Pentium® 4, and Itanium® and Itanium® II microprocessors available from Intel Corporation, although other systems (including personal computers (PCs) having other microprocessors, personal digital assistants and other hand-held devices, engineering workstations, set-top boxes and the like) may also be used. In one embodiment, sample system 400 may be executing a version of the Windows™ operating system available from Microsoft Corporation, although other operating systems and graphical user interfaces, for example, may also be used.

Referring to FIG. 4, sample processing system 400 includes a memory system 422 and a processor 414. Memory system 422 is intended as a generalized representation of memory and may include a variety of forms of memory, such as a hard drive, CD-ROM, random access memory (RAM), dynamic random access memory (DRAM), static random access memory (SRAM) and related circuitry.

Memory system 422 may store instructions 410 and/or data 412 represented by data signals that may be executed by processor 414. The instructions 10 and/or data 412 may include code for performing any or all of the techniques discussed herein. For an embodiment wherein the method 100 is performed by a device driver, instructions 410 may include a device driver program 302.

FIG. 4 illustrates that the instructions implementing an embodiment 100 of the method discussed herein may be logically grouped into various functional modules. For an embodiment performed by a device driver 302, the device driver 302 may include an initializer 421, a default mode request handler 424 and a priority mode request handler 426.

When executed by processor 414, initializer 421 performs general initialization 101 to place the computing device 310 in the default infrared signaling mode as described above in connection with FIG. 1.

The default mode requests handler 424, when executed by the processor 414, handles 108 default mode signaling requests, such as write requests, as is discussed in further detail above in connection with FIGS. 1 and 8.

When executed by the processor 414, the priority mode request handler 426 provides a mechanism for handling priority mode IR signaling requests, such as "open", "write" and "close" requests. Such mechanism is discussed in further detail above in connection with FIGS. 1, and 5-7.

While particular embodiments of the present invention have been shown and described, it will be obvious to those skilled in the art that changes and modifications can be made without departing from the present invention in its broader aspects. The appended claims are to encompass within their scope all such changes and modifications that fall within the true scope of the present invention.

What is claimed is:

1. A computer-implemented method comprising:
   entering a priority infrared signaling mode;
   ignoring a default mode write request while in the priority mode;
   transitioning, responsive to receipt of a priority mode close request, into the default infrared signaling mode; and
   relinquishing handling of the ignored default mode write request by a device driver to an error recovery mechanism of an upper protocol layer, wherein the error recovery mechanism recovers the default mode write request;
   wherein the priority mode is a consumer infrared (CIR) signaling mode and the default mode is an Infrared Data Association (IrDA) infrared signaling mode.

2. The method of claim 1, wherein:
   said ignoring further comprises generating a success indicator associated with the default mode write request; and
   said relinquishing further comprises relinquishing handling of the ignored default mode write request to an error recovery mechanism that recovers the default mode write request responsive to receipt of the success indicator.

3. The method of claim 1, wherein the default mode write request is received by a device driver via a network stack.

4. The method of claim 1, wherein entering a priority infrared signaling mode further comprises transitioning, responsive to receipt of a priority mode open request, into the priority infrared signaling mode from a default infrared signaling mode.

5. The method of claim 4, wherein:
   the priority mode open request is received by a device driver outside of a network stack.

6. The method of claim 1, further comprising:
processing a priority mode write request to transmit an infrared signal while in the priority infrared signaling mode.

7. The method of claim 1, further comprising:
transitioning, responsive to receipt of a priority mode close request, from the priority infrared signaling mode to the default infrared signaling mode.

8. The method of claim 1, wherein ignoring a default mode write request further comprises:
dropping a packet associated with the default mode write request.

9. An article comprising:
a machine-readable storage medium having a plurality of machine accessible instructions;
wherein, when the instructions are executed by a processor, the instructions provide for
entering a priority infrared signaling mode;
ignoring a default mode write request while in the priority mode;
transitioning, responsive to receipt of a priority mode close request, into the default infrared signaling mode; and
relinquishing handling of the ignored default mode write request by a device driver to an error recovery mechanism of an upper protocol layer, wherein the error recovery mechanism recovers the default mode write request;
wherein the priority mode is a consumer infrared (CIR) signaling mode and the default mode is an Infrared Data Association (IrDA) infrared signaling mode.

10. The article of claim 9, wherein:
the instructions that provide for said ignoring further provide for generating a success indicator associated with the default mode write request; and
the instructions that provide for relinquishing handling of the ignored default mode write request further provide for relinquishing handling of the ignored default mode write request to an error recovery mechanism of an upper protocol layer to recover the default mode write request responsive to the success indicator.

11. The article of claim 9, wherein the instructions further provide for receiving the default mode write request via a network stack.

12. The article of claim 11, wherein the instructions further provide for receiving the priority mode open request outside of a network stack.

13. The article of claim 9, wherein the instructions that provide for entering a priority infrared signaling mode further include instructions that provide for:
transitioning, responsive to receipt of a priority mode open request, into the priority infrared signaling mode from a default infrared signaling mode.

14. The article of claim 9, wherein the instructions further provide for:
processing a priority mode write request to transmit an infrared signal while in the priority infrared signaling mode.

15. The article of claim 9, wherein the instructions further provide for:
transitioning, responsive to receipt of a priority mode close request, from the priority infrared signaling mode to the default infrared signaling mode.

16. The article of claim 9, wherein the instructions that provide for ignoring a default mode write request further include:
instructions that provide for dropping a packet associated with the default mode write request.

17. A device driver, comprising:
an initializer to place a computing device into a default infrared signaling mode;
a priority mode request handler to place the computing device into a priority infrared signaling mode responsive to receipt of a priority mode signaling request; and
a default mode request handler to drop a packet associated with a default mode signaling request responsive to receiving the default mode signaling request while the computing device is in a priority infrared signaling mode;
wherein the priority mode is a consumer infrared (CIR) signaling mode and the default mode is an Infrared Data Association (IrDA) infrared signaling mode.

18. The device driver of claim 17, wherein:
the initializer is to place the computing device into the default infrared signaling mode at least by modifying a software indicator.

19. The device driver of claim 17, wherein:
the initializer is to place the computing device into the default infrared signaling mode at least by modifying a hardware indicator.

20. A system comprising:
an infrared device; and
a computing device that includes a network stack program, the computing device further including a device driver program to provide for communication with the infrared device;
wherein the device driver program further includes a priority mode request handler to drop a packet associated with a default mode signaling request responsive to receiving the default mode signaling request while the computing device is in a priority infrared signaling mode; and
wherein the network stack program further provides, responsive to determining that the packet was dropped, error recovery for the dropped packet;
wherein the priority mode is a consumer infrared (CIR) signaling mode and the default mode is an Infrared Data Association (IrDA) infrared signaling mode.

21. The system of claim 20, wherein providing error recovery for the dropped packet further comprises:
forwarding the information in the packet to the infrared device.

22. The system of claim 20, wherein:
the infrared device is capable of receiving communication according to a Consumer Infrared protocol.

23. The system of claim 20, further comprising:
a second computing device capable of receiving communication according to the IrDA protocol.

24. The system of claim 23, wherein:
the device driver is further to provide for communication with the second computing device.

* * * * *